Figure 2:
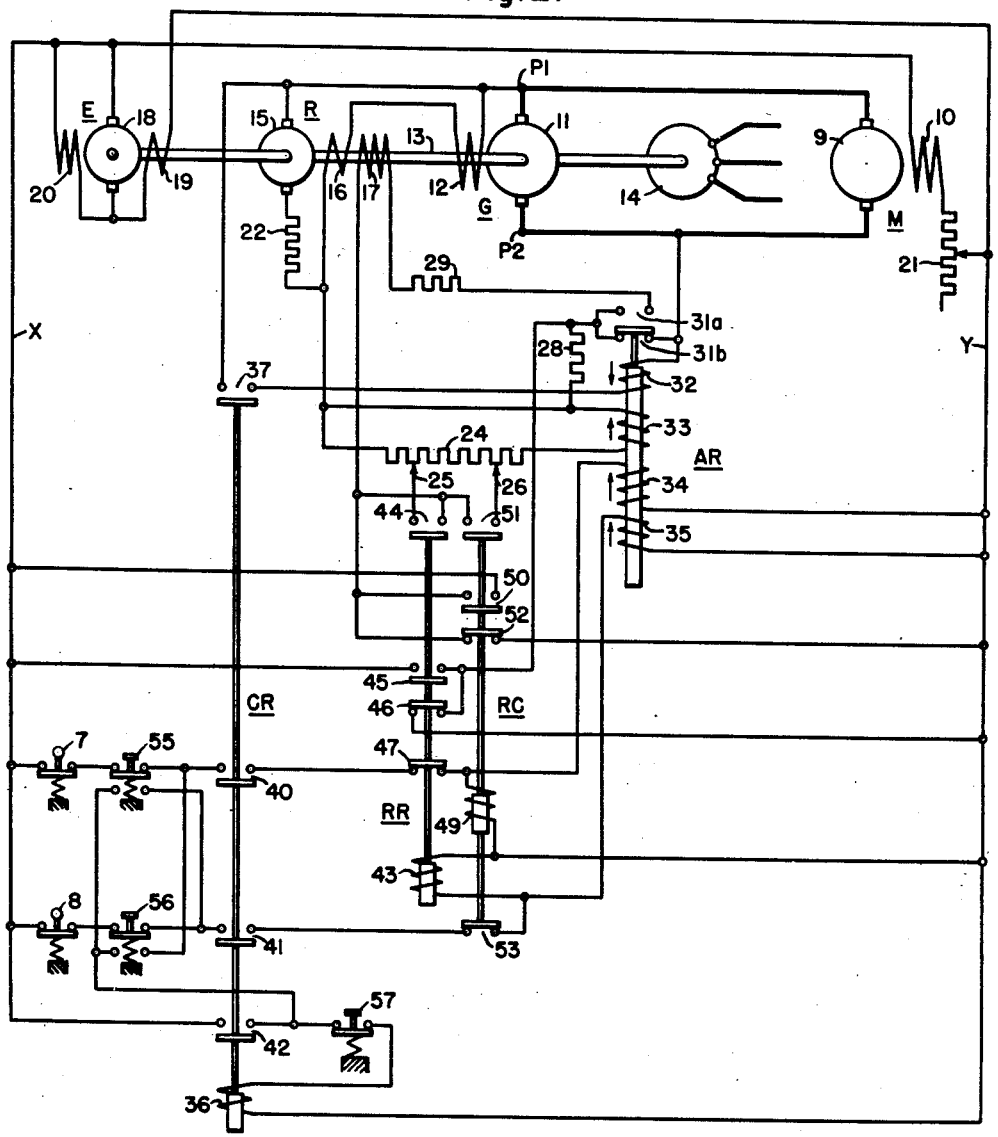

July 25, 1950     R. L. KLAR, JR     2,516,577
ELECTRIC CONTROL SYSTEM FOR DIRECT CURRENT MOTORS Filed Jan. 19, 1949     2 Sheets-Sheet 1

WITNESSES:
Robert G. Baird
New C. Goods

INVENTOR
Robert L. Klar, J
BY
Paul E. Friedeman
ATTORNEY

WITNESSES:
Robert C. Baird
New. C. Groome

INVENTOR
Robert L. Klar, Jr.
BY
Paul E. Friedemann
ATTORNEY

Patented July 25, 1950

2,516,577

UNITED STATES PATENT OFFICE 2,516,577

ELECTRIC CONTROL SYSTEM FOR DIRECT-CURRENT MOTORS

Robert L. Klar, Jr., Cincinnati, Ohio, assignor to Westinghouse Electric Corporation, East Pittsburgh, Pa., a corporation of Pennsylvania Application January 19, 1949, Serial No. 71,596

10 Claims. (Cl. 318—145)

My invention relates to electric control systems, and more particularly to variable voltage systems utilized for reciprocating machine tools as planers.

In known variable voltage systems, the main generator for providing the output voltage has its field winding excited under control by a regulating generator. As a rule, the regulating generator is equipped with at least three field windings. One of these windings is self-exciting while the two others receive separate excitation. A pattern voltage of selected magnitude is applied to one of the latter windings, and the other is excited in dependence upon the voltage of the main generator and acts in opposition to the pattern field winding. When the output voltage of the system is in accordance with the selected value of the pattern voltage, the two separately excited field windings of the regulating generator balance each other so that their resultant control effect is zero. If the output voltage is higher or lower than the pattern voltage, the differential effect of the two separately excited field windings in the regulating generator assumes a finite value and of such a direction as to cause the regulating generator to change the field excitation of the main generator by an amount and in such a direction as is required to reduce the departure of the output voltage from the desired value. In this manner, the system tends to maintain the main generator output voltage at a constant value determined by the selected magnitude of the pattern voltage. Such systems have been used for energizing and regulating the speed of a direct-current motor.

It is an object of my invention to achieve a self-regulating performance related in type to the one just mentioned, but by means of simpler control systems than those required in the known systems. In particular, the invention aims at achieving a self-regulating performance of high stability and reliability with the aid of a regulating generator in which a single field winding performs the functions of the above-mentioned three field windings heretofore customary.

Another object of my invention is the provision of a variable voltage drive especially suitable for machine tools which permits a frequent reversal of the drive motor and which secures a high reversing speed so that the drive can be used to advantage in conjunction with planers and other machines requiring very frequent reversals and operating often with relatively short strokes.

Figure 1:
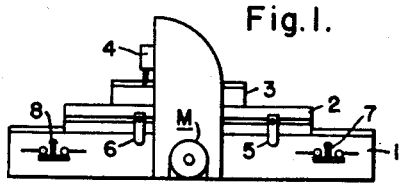
Figure 3:
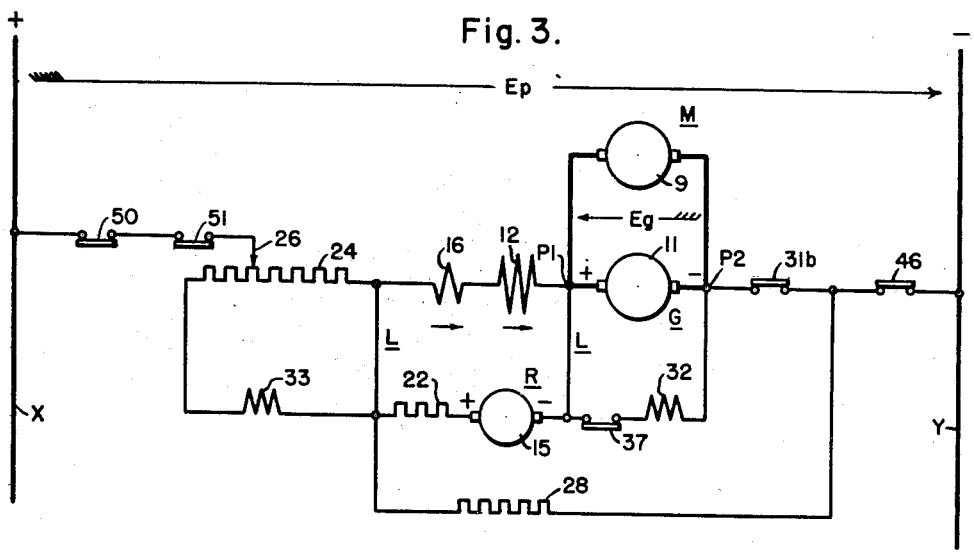
Figure 4:
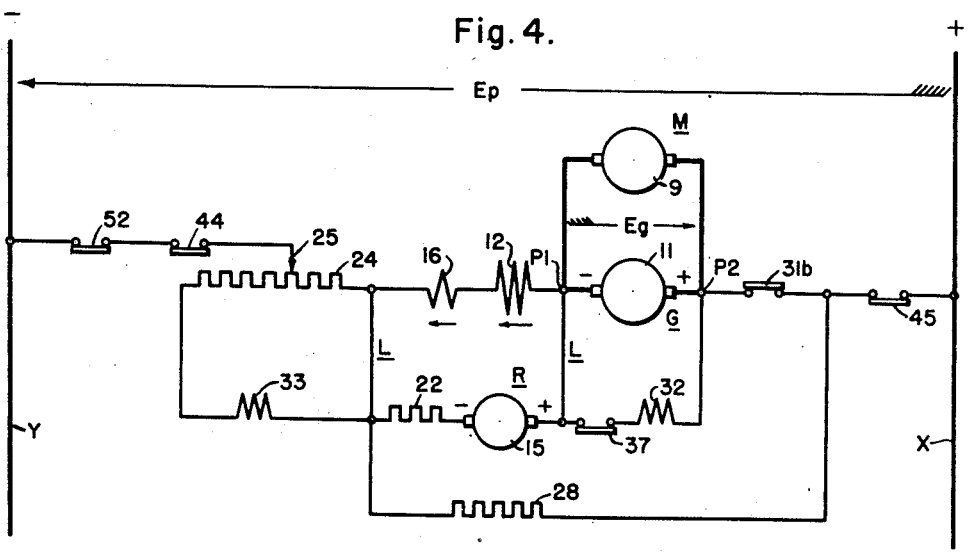

These and other objects, as well as the means provided by the invention for achieving them, will be apparent from the following description of the embodiment illustrated in the drawing, in which:

Figure 1 shows schematically a planing machine equipped with an electric drive motor, Fig. 2 a diagram of the electric system for controlling the drive motor, while Figs. 3 and 4 represent schematically two different circuits that occur during respectively different operating conditions of the control system shown in Fig. 2.

The planer illustrated in Fig. 1 has a supporting frame structure 1 which carries a horizontally reciprocable bed 2 for accommodating a work piece 3. The appertaining tool carrier is denoted by 4. Two adjustable dogs 5 and 6 are mounted on bed 2 for cooperation with a cut limit switch 7 and a return limit switch 8 which form part of the electric system for controlling the drive motor M of the machine tool.

The connection of motor M and limit switches 7 and 8 within the electric system is apparent from Fig. 2, where these elements are denoted by the same reference characters as in Fig. 1.

According to Fig. 2, the drive motor M has an armature 9 and a separately excited field winding 10. The armature 9 is connected across the armature 11 of a main generator G, and hence energized by the output voltage of generator G. This output voltage is controlled by a main generator field winding 12. The shaft 13 of armature 11 is driven by an auxiliary motor 14 operating at substantially constant speed. Shaft 13 also carries the armature 15 of a regulating generator R which has two control field windings 16 and 17. Mounted on the shaft 13 of the main generator G is also the armature 18 of an exciter E equipped with a series field winding 19 and a shunt field winding 20. When the system is in operation, the exciter E impresses a substantially constant direct-current voltage on mains X and Y. It should be understood that the exciter E serves merely as a convenient source of constant direct-current voltage, and, if desired, may be replaced by an available direct-current line or other voltage source without affecting the performance of the system proper.

The field winding 10 of motor M is connected across mains X and Y in series with an adjusting rheostat 21, the setting of which normally remains unchanged during the operation of the system. Consequently, the speed of motor M is determined by the output voltage generated in armature 11 of main generator G which, in turn, depends on the excitation of field winding 12.

The system for controlling the excitation of field winding 12 includes resistors 22, a rheostat 24, with two sliders 25 and 26, and two auxiliary resistors 28 and 29. The resistor 22 is series connected with field windings 16 and 12 and with the armature 15 so as to form a loop circuit. By proper dimensioning of resistor 22, this loop circuit is so tuned that its resistance characteristic coincides approximately with the no-load magnetization characteristic of the regulating generator R. As a result, the voltage generated by armature 15 is sustained by the self-exciting effect of field winding 16 so that this voltage tends to maintain its value at any point along the straight portion of the magnetization characteristic. Hence, a field control effect of relatively low intensity suffices to change the regulating generator voltage by shifting it along the straight portion of the characteristic, and this control effect is superimposed on the loop circuit by the circuit connections described hereinafter.

The loop circuit, at the junction of armature 15 and field winding 12, is connected to one terminal, P1, of the main generator G. This same loop circuit, at the junction of field winding 16 and resistor 22, is connected, through resister 28 and contacts 31b to the other terminal, P2, of the main generator G. Contacts 31b are back, or normally closed, contacts of the accelerating relay AR. During normal loading of the motor M and thus normal speed of operation, contacts 31b are closed and thus help maintain the circuit just traced.

The accelerating relay AR has its contacts 31a and 31b controlled by two main coils 32 and 33 and two calibrating coils 34 and 35. Coils 32 and 33 furnish the main energization for the relay but act in opposition to either of coils 34 or 35 so that the position of contacts 31a and 31b change only when the differential effect of coils 32 and 33 exceeds a given value whose magnitude depends on which one of the coils 34 and 35 is energized at the particular time in question. Coil 32 is, when contacts 37 of the control relay CR are closed, connected across the main generator armature 11, namely terminals P1 and P2, and hence measures the output voltage of the main generator. Coil 33 is connected across all the resistor sections of rheostat 24 and hence responds to a selected but constant voltage equal to the constant exciter voltage minus the pattern voltage developed across resistor 28.

A better understanding of my invention may be obtained from a study of typical operating cycles. To start the equipment, the auxiliary motor 14 is energized, and in consequence, the main generator G is brought up to full speed, the regulating generator R is brought up to full speed, and the exciter E is brought up to full speed.

The exciter E builds up to full voltage and thereafter keeps bus X at a given constant positive voltage with reference to the negative or grounded bus Y. The regulating generator R and the main generator G do not build up to any voltage. The reason for this follows from some of the features of my system of control. The regulating generator R, in the absence of some pattern field, or pattern field effect, is unstable because the resistance value of the loop circuit including the armature 15, resistor 22, series field 16 and main generator field 12 is so chosen as to coincide with the straight portion of the no-load saturation curve. This regulating generator thus inherently fails to build up. Further, as seen from Fig. 3, it is apparent that the polarities of the two generators, R and G, are such that they tend to nullify each other. Since the terminals P1 and P2 are thus at no voltage, the motor M does not operate.

Assuming the planer platen, or bed 2, is in the extreme forward position—the extreme left-hand position in Fig. 1—then the return limit switch 8 is open. To start the main motor M to move the bed 2 in the cut direction, the attendant actuates push button 56. This operation establishes an energized circuit from bus X through the cut limit switch 7, the back contacts of the return push button 55, the make contacts of the cut push button 56, the stop switch 57, actuating coil 36 of the control relay CR to the negative bus Y.

Operation of the control relay CR causes the closing of contacts 37, 40, 41 and 42.

Closure of contacts 40 establishes a circuit from bus X through the cut limit switch, return push button 55, contacts 40 of control relay CR, back contacts 47 of the relay RR for return movement, the actuating coil 49 of the relay RC for cut movement to bus Y. The coil 34 of the accelerating relay AR is connected in parallel to coil 49 and is thus also energized by the closure of contacts 40.

The closure of contacts 41 has no effect at this time because operation of the cut relay RC upon energization of coil 49 opens the circuit for coil 35 of the accelerating relay AR and opens the circuit for the actuating coil 43 of the return relay RR. Further, these coils 43 and 35 cannot become energized because the return limit switch 8 is open for the starting position specified.

The closure of contacts 42 provides a holding circuit for coil 36 of the control relay CR. This relay thus continues to hold its contacts 37, 40, 41 and 42 closed after the equipment has once been started.

Closure of contacts 37 connects the coil 32 to the terminals P1 and P2. No immediate effect will be produced on coil 32 because there is substantially no voltage across the terminals P1 and P2 for the time under consideration.

Energization of coil 34 causes the operation of the accelerating relay AR and the consequent opening of contacts 31b and the closing of contacts 31a. The opening of contacts 31b prevents the direct interconnection of the buses X and Y, namely, the connection of the exciter E to the field windings 16 and 12, but the closing of contacts 31a establishes a circuit from bus X through contacts 50, field winding 17, excitation control resistor 29, contacts 31a and contacts 46 to the bus Y. The resistor 29 may be adjustable.

The field winding 17, having relatively many ampere turns thus rapidly causes the voltage of the regulating generator to build up with the polarity indicated. The regulating generator armature is connected in the loop circuit comprising terminal P1, main field winding 12 for the generator G, series field winding 16 for the regulating generator R, resistor 22, and armature 15 back to terminal P1. The generator field winding 12 is thus heavily excited and a considerable voltage appears across terminals P1 and P2. The result is that the motor M accelerates its load with dispatch.

Coils 34 and 35 are merely calibrating coils. Coil 34 is effective for the cut direction and coil 35 for the reverse, or return, direction. Thus, as soon as the acceleration of the load by motor M is complete, the voltage across terminals P1 and P2 is up to normal, or somewhat above due to the action of field 17, the coil 32 acting differential to the net energization of coils 34 and 33 causes the accelerating relay to drop out, coil 33 being differential to 34 but of lesser magnitude.

Under normal operating conditions, the differential effect of coils 32 and 33 in opposition to coil 34 (or 35) maintains the energization below the pick-up value of the armature for relay AR. The result is that the accelerating relay AR remains in the illustrated position most of the time. During starting, and primarily during every reversal, namely while the motor M is caused to be retarded and accelerated, the differential effect of coils 32 and 33 becomes small enough to temporarily effect the pick-up of the armature of relay AR and thus the closing of contacts 31a. The field winding 17 is thus energized at each reversal to effect rapid reversal.

When the field 17 is energized, the regulating effect, discussed more in detail below, is not in operation. An instant after acceleration is complete, contacts 31a open to thus disconnect field 17 and contacts 31b close to establish the regular operating circuit for the cut direction or the reverse direction, depending on which of the relays RR or RC is at the time in question energized.

Energization of coil 49 causes the closing of contacts 50 and 51, and the opening of contacts 52 and 53. The closure of contacts 50 and 51 energizes the circuit shown in Fig. 3.

This circuit of Fig. 3 may be traced from bus X through contacts 50 and 51, the adjustable lead 26 on the rheostat 24, the resistor sections of the rheostat to the left of the connecting position of the conductor 26 (in Fig. 3 the resistor sections in question are at the right), series field 16 of the regulating generator R, the main field 12 of the main generator G, the armature 11 of the main generator G, back contacts 31b of the accelerating relay AR, and contacts 46 to the negative bus Y of the exciter E.

The coil 33 of the accelerating relay is connected across the rheostat 24 and is thus also, as now indicated, in the circuit discussed in the preceding paragraph. A resistor 22 and the armature 15 of the regulating generator R are connected in a loop circuit as more clearly shown in Fig. 3. The motor M is connected directly to the terminals P1 and P2 of the main generator G and the contacts 37 and coil 32 of the accelerating relay AR are also connected to the terminals P1 and P2, respectively. Further, a resistor 28 is connected across the junction between field 16 and resistor 22 and the junction between contacts 31b and contacts 46.

Once the motor M starts the push button 56 is released to the position shown. This does not affect the operation, since the holding circuit through contacts 42 is completed. Drop-out of control relay CR can thus be effected only through actuation of the stop switch 57.

It will be recognized from Fig. 3 and its comparison with the more detailed showing of Fig. 2 that after the picking up of relays CR and RC, the portion of the regulating loop circuit that contains the series-connected field windings 12 and 16 is connected in a circuit which includes in series the main generator armature and the exciter E with the appertaining rheostat 24. The polarity of connection is such that the variable voltage Eg generated in the armature 11 and impressed on the drive motor M is in series opposition to the constant voltage (pattern voltage) Ep appearing across resistor 29 but derived from the exciter and adjusted by means of the slider 26 on rheostat 24. When the generator voltage Eg is equal to the adjusted pattern voltage Ep, the resultant voltage impressed on the loop circuit L, including armature 15, resistor 22 and fields 16 and 12, is zero. Consequently, the voltage then generated in armature 15 of generator R remains constant, thus exciting the main generator field 12 for maintenance of the voltage Eg; and the motor M is caused to operate at a substantially constant speed whose value is in accordance with the setting of slider 26 on rheostat 24.

When the motor speed is below the desired value, and hence the generator output voltage Eg below the pattern voltage Ep, the resultant of both voltages has the direction of the pattern voltage and is impressed on the loop circuit with the effect of a separate and corrective excitation. This, in turn, causes the regulating generator to generate a correspondingly increased voltage in its armature 15. This increased control voltage is effective in the main generator field winding 12 to raise the generator output voltage Eg to the correct value, thereby increasing the speed of the drive motor correspondingly. When the generator voltage Eg and the speed of motor M are too high, a resultant of voltages Ep and Eg appears in a direction determined by that of voltage Eg. This resultant voltage imposes on the regulating loop circuit L a corrective excitation in the direction opposite to that above mentioned so that the armature 15 is caused to reduce its generated voltage, thereby reducing the field excitation of generator G and the speed of motor M accordingly until the voltages Ep and Eg are again balanced.

It will be recognized that during the performance described in the foregoing only the field winding 16 of regulating generator R is in operation, and that this winding performs three functions, namely, the provision of self-excitation, a field response to a selected pattern voltage supplied from buses X and Y, and a response to a variable or pilot voltage supplied by generator G.

During the initial portions of the cutting stroke the dog 6 resets the return limit switch 8 (Fig. 1) to closed position and at or near the end of the cutting stroke the dog 5 (Fig. 1) opens the cut limit switch 7. The opening of the cut limit switch 7 effects the deenergization of coils 34 and 49.

The cut control relay RC thus drops out opening the contacts 50 and 51, and closing the contacts 52 and 53. The closure of contacts 53 establishes a circuit from bus X through the return limit switch 8, the cut push button 56, contacts 41 and 53, coil 43 of the return control relay RR to bus Y. The calibrating coil 35 is connected in parallel with coil 43 and is thus also energized at the end of the return stroke.

Again accelerating relay AR is caused to close the contacts 31a and to open contacts 31b. The energization of coil 43 effects the closing of contacts 44 and 45, and the opening of contacts 46 and 47. The opening of contacts 46 disconnects terminal P2 from the bus Y. The opening of contacts 47 prevents any possibility of energizing coil 49 when the limit switch 7, during the initial stages of the return stroke, is closed. The closure of contacts 45 and 31a establishes a circuit from bus X through contacts 45 and 31a, resistor 29, field winding 17 (energized in opposite direction to the energization in the cut direction) and back contacts 52 to the negative bus Y. The polarity of both the regulating generator R and the main generator is reversed. The motor is stopped rapidly and accelerated in the reverse direction in view of the heavy excitation of field winding 17.

As soon as acceleration is completed, the accelerating relay drops out to close contacts 31b and open contacts 31a. This operation in conjunction with previous operation of the reverse, or return, relay RR, having closed the contacts 44 and 45, establishes a circuit from the positive bus X through contacts 45 and 31b to terminal P2, armature 11 of the main generator to terminal P1, field windings 12 and 16 of the main generator and regulating generator R, respectively, the relatively few resistor sections of rheostat 24 to the right of the junction of the adjustable conductor 25, the conductor 25, and contacts 44 and 52 to the negative bus Y.

Since fewer resistor sections of the rheostat 24 are included in the circuit for the fields 12 and 16, the pattern field effect is greater than for the cut direction, and as a result the motor M is operated in the return direction at a higher speed. The various loop circuits discussed in connection with the cut direction are also associated with the circuit traced, but all the units are energized with opposite polarity. The return stroke is terminated when the dog 6 (Fig. 1) causes the return limit switch 8 to open the circuit for coil 43.

When the strokes of the driven machinery are relatively long, the reversing performance extends only over a small portion at the beginning and end of each stroke. When the operating strokes are reduced, the quick reversing performance of the circuit extends over a correspondingly larger proportion of each stroke, and the system may be so adjusted that when the strokes are very small, the accelerating relay AR remains picked up virtually all of the time so that no regulating effect is produced.

It will be understood by those skilled in the art that the loop circuit feature according to Figs. 3 and 4 can be used without applying the quick reversing feature, and that for other special cases of application the quick reversing feature may be applied without using the circuit features of Figs. 3 and 4. It will further be understood that variable voltage systems according to the invention can be modified and altered with respect to details of the control circuits and appertaining circuit devices without departing from the principles of the invention and within its essential features as set forth in the claims annexed hereto.

I claim as my invention:

1. A variable voltage system, comprising a main generator having an armature for providing an output voltage and a field winding for controlling said voltage, a regulating generator having an armature and a field winding connected together with said main generator field winding to form a closed circuit, and energized circuit means, to provide a pattern voltage, connected in series with said main generator armature across said two field windings for causing said regulating generator to regulate said main generator for maintaining said output voltage at a value determined by said pattern voltage.

2. A variable voltage system, comprising a main generator having an armature for providing an output voltage and a field winding for controlling said voltage, a regulating generator having an armature and a field winding connected together with said main generator field winding to form a closed circuit, said closed circuit having a resistance adjusted so that the resistance characteristic coincides approximately with the no-load magnetization characteristic of said regulating generator, and energized circuit means for providing a pattern voltage having rheostat means for adjusting said pattern voltage and being connected in series with said main generator armature across said two field windings for causing said regulating generator to regulate said main generator for maintaining said output voltage at a value determined by said pattern voltage.

3. A variable voltage system, comprising a main generator having an armature for providing an output voltage and a field winding for controlling said voltage, a regulating generator having an armature and a field winding connected together with said main generator field winding to form a closed circuit, voltage supply circuit means, for providing a pattern voltage, connected in series with said main generator armature across said two field windings for causing said regulating generator to regulate said main generator for maintaining said output voltage at a value determined by said pattern voltage, and reversing contact means forming part of said circuit means for reversing the polarity of said pattern voltage in order to cause said main generator to reverse said output voltage.

4. A motor control system, comprising a direct-current motor, a main generator having an armature connected to said motor for providing adjustable voltage therefor and a field winding for controlling said voltage, a regulating generator having an armature and a field winding connected together with said main generator field winding to form a closed circuit, and energized circuit means for providing a pattern voltage and connected in series with said main generator armature across said two field windings for causing said regulating generator to regulate said main generator for maintaining said motor at a speed determined by said pattern voltage.

5. A motor control system, comprising a direct-current motor, a main generator having an armature connected to said motor for providing adjustable voltage therefor and a field winding for controlling said voltage, a regulating generator having an armature and a field winding connected together with said main generator field winding to form a closed circuit said closed circuit having a resistance adjusted so that the resistance characteristic coincides approximately with the no-load magnetization characteristic of said regulating generator, and voltage supply circuit means for providing a pattern voltage having rheostat means for adjusting said pattern voltage and being connected in series with said main generator armature across said two field windings for causing said regulating generator to regulate said output voltage for maintaining said motor at a speed determined by said adjusted pattern voltage.

6. A motor control system, comprising a direct-current motor, a main generator having an armature connected to said motor for providing adjustable voltage therefor and a field winding for controlling said voltage, a regulating generator having an armature and a field winding connected in series with said main generator field winding to form a loop circuit, voltage supply circuit means disposed for providing a pattern voltage and comprising an exciter and a rheostat connected in series with said main generator armature across said two field windings to regulate said output voltage for maintaining said motor at a speed determined by said pattern volt-